United States Patent
Yen et al.

(10) Patent No.: US 9,641,395 B2
(45) Date of Patent: May 2, 2017

(54) METHOD OF PROCESSING DEVICE DISCOVERY

(75) Inventors: Chia-Wei Yen, Taipei (TW); Jian-Li Mao, Suzhou (CN)

(73) Assignee: MEDIATEK INC., Hsin-Chu (TW)

( * ) Notice: Subject to any disclaimer, the term of this patent is extended or adjusted under 35 U.S.C. 154(b) by 689 days.

(21) Appl. No.: 13/568,152

(22) Filed: Aug. 7, 2012

(65) Prior Publication Data

US 2013/0044640 A1 Feb. 21, 2013

Related U.S. Application Data

(60) Provisional application No. 61/523,406, filed on Aug. 15, 2011.

(51) Int. Cl.
*H04L 12/24* (2006.01)

(52) U.S. Cl.
CPC .................................... *H04L 41/12* (2013.01)

(58) Field of Classification Search
CPC ....................................................... H04L 41/12
USPC ......................................................... 370/255
See application file for complete search history.

(56) References Cited

U.S. PATENT DOCUMENTS

| 2012/0236757 A1* | 9/2012 | Klein | 370/255 |
| 2012/0239794 A1* | 9/2012 | Klein | 709/223 |
| 2013/0044750 A1* | 2/2013 | Yen et al. | 370/392 |
| 2013/0250810 A1* | 9/2013 | Ho et al. | 370/255 |

FOREIGN PATENT DOCUMENTS

| CN | 1567767 A | 1/2005 |
| CN | 101197780 A | 6/2008 |
| CN | 101202668 A | 6/2008 |
| CN | 101335747 A | 12/2008 |
| CN | 101517977 A | 8/2009 |
| CN | 101990663 A | 3/2011 |

OTHER PUBLICATIONS

IEEE, Draft 0.4 P802.17/D0.4, Nov. 8, 2011, IEEE pp. 1-82.*
U.S. Appl. No. 61/452,622, filed Mar. 2011, Klein, Philippe.*

* cited by examiner

*Primary Examiner* — Jung Park
*Assistant Examiner* — Albert Shih
(74) *Attorney, Agent, or Firm* — Winston Hsu; Scott Margo (57) ABSTRACT

A method of processing device discovery for a first communication device in a network system is disclosed. The method comprises generating a discovery management frame including an identity and a medium access control (MAC) address of the first communication device, broadcasting the discovery management frame, and when a response corresponding to the discovery management frame is received from the second communication device, adding an entry with the identity and the MAC address of the second communication device in a device table stored in the first communication device.

12 Claims, 11 Drawing Sheets

METHOD OF PROCESSING DEVICE DISCOVERY

CROSS REFERENCE TO RELATED APPLICATIONS

This application claims the benefit of U.S. Provisional Application No. 61/523,406, filed on Aug. 15, 2011, entitled "Device Discovery Process Method Based on MAC Abstraction Sub-layer", the contents of which are incorporated herein in their entirety.

BACKGROUND

With rapidly growing of user's needs for accessing digital contents everywhere, various communication technologies have been developed for transmission of the digital contents. These communication technologies may be developed for different environments, different transmission speeds and/or different user requirements. In addition, several medium access control (MAC) protocols are established based on different communication standards, which define different communication methods based on heterogeneous mediums. For example, IEEE 1901 communication standard is used for power line (PLC), IEEE 802.11 communication standard is used for wireless communication (i.e. WiFi), IEEE 802.3 communication standard is used for Ethernet, and Multimedia over Coax Alliance (MoCA) communication standard is used for coaxial cables, and so on.

Figure 1:
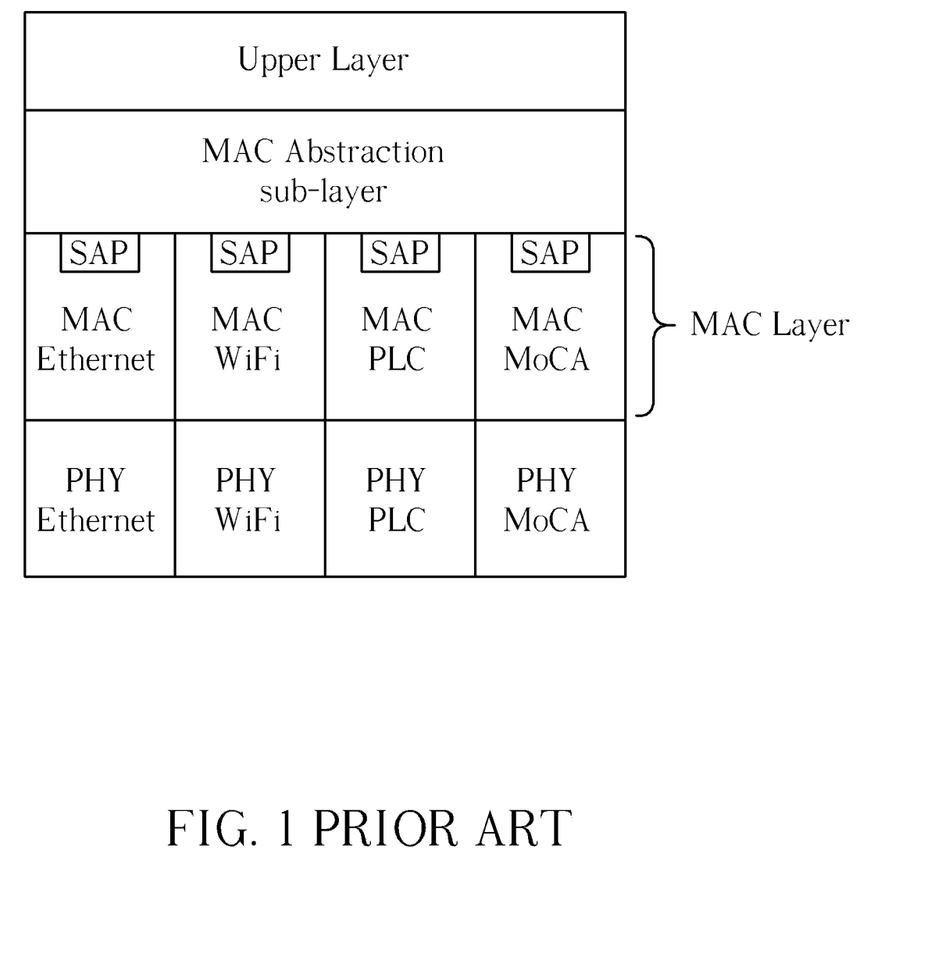
FIG. 1 is a schematic diagram of a communication device according to the prior art.

As a result, a MAC abstraction sub-layer is developed for convergence of these various media. Please refer to FIG. 1, which is a schematic diagram of an exemplary communication device 10 in a data plane. The communication device 10 may be a mobile phone, laptop, tablet computer, electronic book, modem, or portable computer system, and uses various media for communication. In FIG. 1, the MAC abstraction sub-layer is arranged between an upper layer and a plurality of MAC types of a MAC layer each corresponding to a medium specification (i.e. PLC MAC, WiFi MAC, MoCA MAC, or Ethernet MAC). Each of the MAC types of the MAC layer includes a service access point (SAP), such that the MAC abstraction sub-layer can communicate with the MAC layer via the corresponding SAPs. The upper layer can be a network layer, a transport layer, an application layer or any layer responsible for processing the signalings and the packets received from the MAC abstraction sub-layer, and signalings and packets to be transmitted via the MAC abstraction sub-layer. In addition, the communication device 10 in the data plane includes a PHY layer with a plurality of PHY types. The plurality of PHY types of the PHY layer include an Ethernet PHY, an WiFi PHY, a PLC PHY and a MoCA PHY, which is complied with the IEEE 802.3 communication standard, IEEE 802.11 communication standard, IEEE 1901 communication standard and MoCA communication standard, respectively. Thus, the packet of the WiFi MAC, Ethernet MAC, PLC MAC or MoCA MAC can be received/transmitted through a corresponding PHY type of the PHY layer.

Further, the MAC abstraction sub-layer provides management functions (i.e. device management, or QoS negotiation) between communication devices. To implement management functions, communication devices should discover how many communication devices are in a network. However, there is no guideline for the device discovery mechanism, and therefore there is no device tables maintained for management frame exchange. In convention, the device table is provided in the communication device and includes at least two elements, device identity (hereafter called DID) and medium access control (MAC) address. By looking up the device table with the DID of a second communication device, a first communication device obtains the MAC address of the second communication device, and thereby unicasts a management frame to the second communication device according to the MAC address of the second communication device.

SUMMARY

The present invention therefore provides a method of processing device discovery, to solve the abovementioned problems.

A method of processing device discovery for a first communication device in a network system is disclosed. The method comprises generating a discovery management frame including an identity and a medium access control (MAC) address of the first communication device, broadcasting the discovery management frame, and when a response corresponding to the discovery management frame, which includes an identity and a medium access control (MAC) address of a second communication device, is received from the second communication device, adding an entry with the identity and the MAC address of the second communication device in a device table stored in the first communication device.

A method of processing device discovery for a first communication device in a network system is disclosed. The method comprises determining whether a discovery management frame including an identity and a medium access control (MAC) address of a second communication device is received, and updating a device table of the first communication device with the obtained identity and MAC address of the second communication device when the discovery management frame is received.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
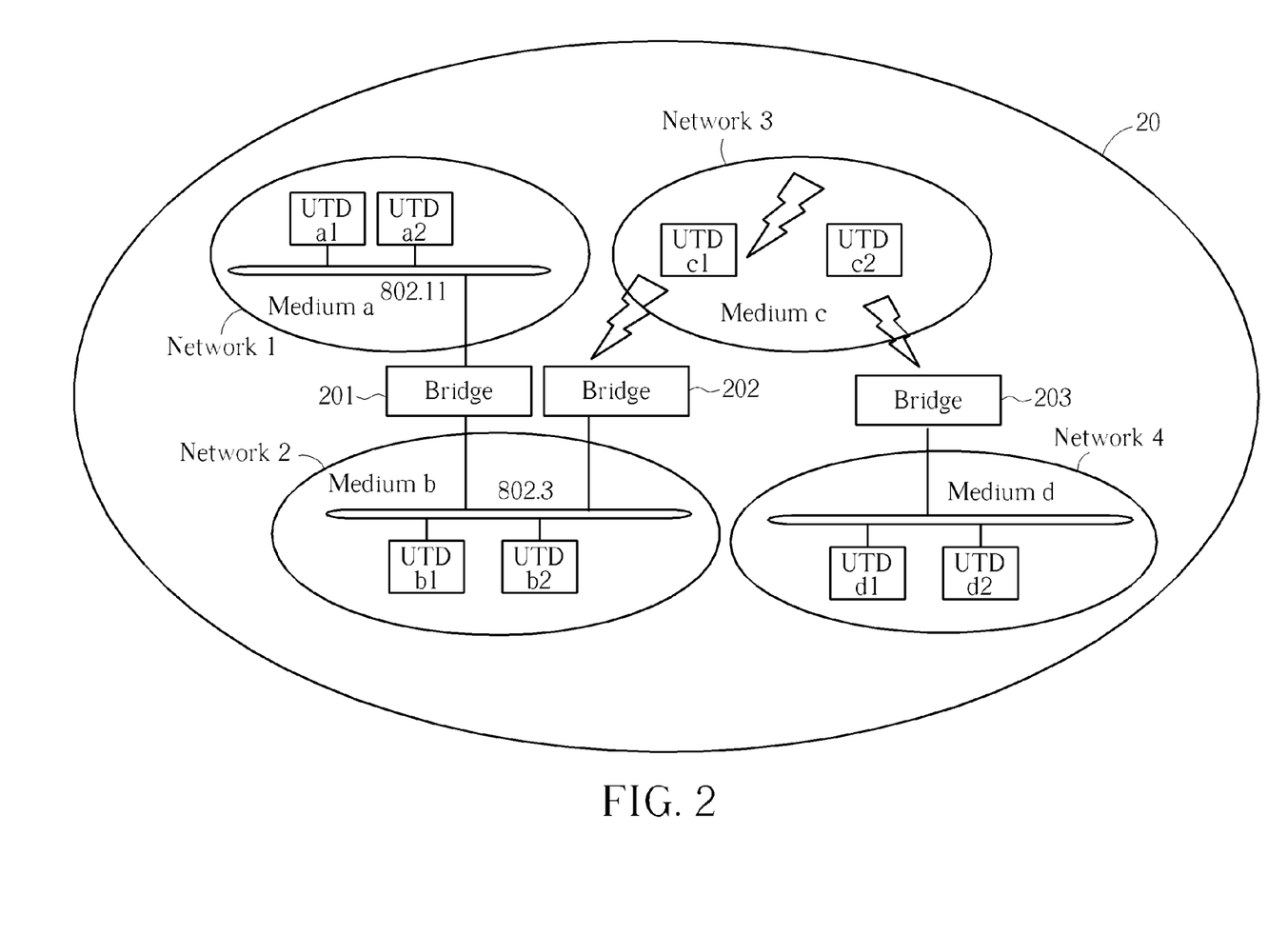
FIG. 2 is a schematic diagram of an exemplary network system according to an example of the present invention.

Please refer to FIG. 2, which is a schematic diagram of an exemplary network system 20 according to the present invention. In FIG. 2, the network system 20 includes networks 1-4 each complied with a communication standard, such as IEEE 1901, IEEE 802.11, IEEE 802.3 or Multimedia over Coax Alliance (MoCA), and bridges 201-203 for communications between the networks 1-4. Every communication standard defines a communication method based on a medium. For example, IEEE 1901 is used for power line (PLC), IEEE 802.11 is used for wireless communication (i.e. WiFi), IEEE 802.3 is used for Ethernet, and Multimedia over Coax Alliance (MoCA) is used for coaxial cables. Therefore, within the network 1, unified terminal devices (UTDs) a1-a2 communicate to each other or to the network 1 via a medium Medium a. Within in the network 2, unified terminal devices b1-b2 communicates to each other or to the network 2 via a medium Medium b, and so on. Further, the unified terminal devices a1-a2, b1-b2, c1-c2, and d1-d2 with different communication mediums communicate with others via the bridges 201-203. For instance, unified terminal devices b1-b2 communicate with unified terminal devices a1-a2 via bridge 201, communicate with unified terminal devices c1-c2 via the bridge 202, and unified terminal devices d1-d2 communicate with unified terminal devices c1-c2 via the bridge 203. Note that, the unified terminal devices a1-a2, b1-b2, c1-c2, and d1-d2 can be mobile phones, laptops, tablet computers, electronic books, modems, and portable computer systems, etc.

Figure 3:
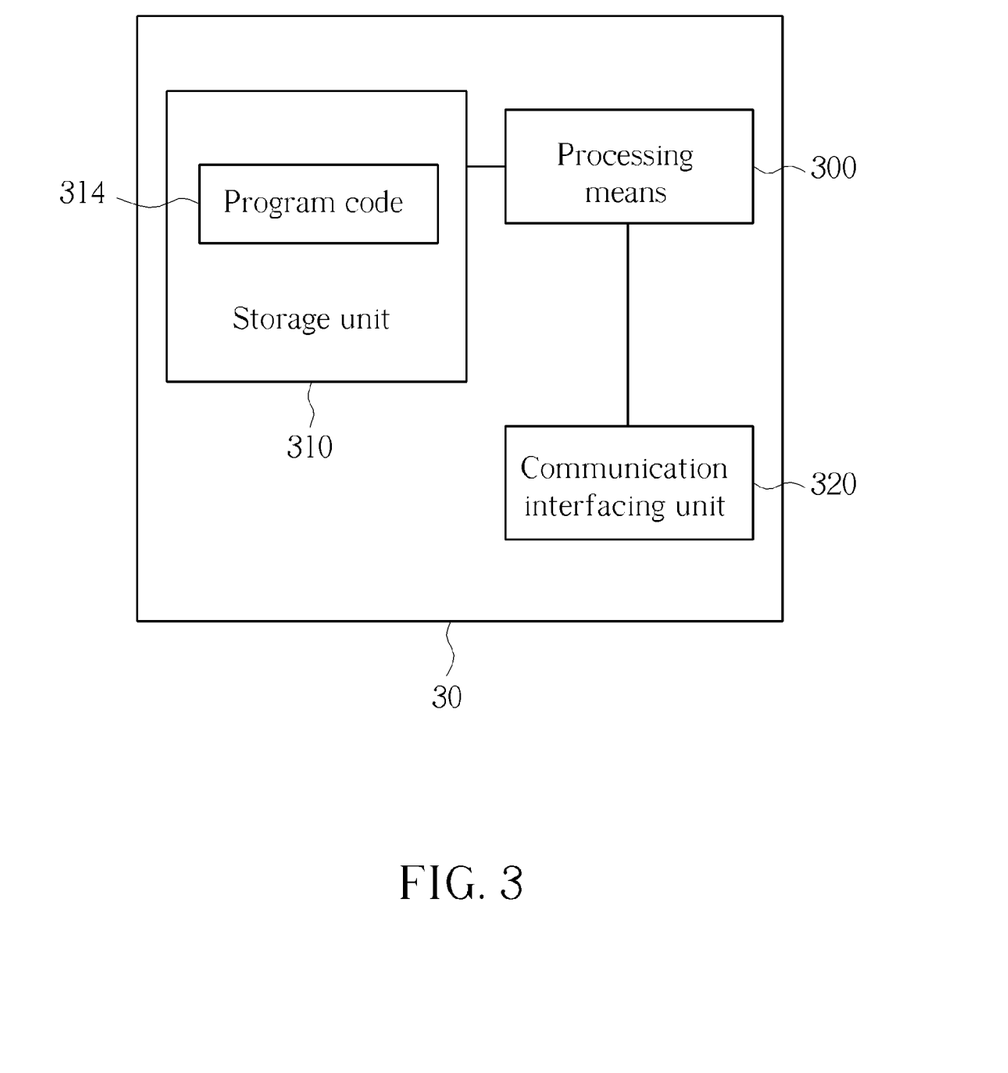
FIG. 3 is a schematic diagram of an exemplary communication device according to an example of the present invention.

Please refer to FIG. 3, which is a schematic diagram of an exemplary communication device 30 according to the present invention. The communication device 30 can be a unified terminal device shown in FIG. 2. The communication device 30 may include a processor 300 such as a microprocessor or an Application Specific Integrated Circuit (ASIC), a storage unit 310 and a communication interfacing unit 320. The storage unit 310 may be any data storage device that can store a program code 314, accessed by the processor 300. Examples of the storage unit 310 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 320 is preferably a transceiver and can exchange signals with a unified terminal device or the network according to processing results of the processor 300.

Figure 4:
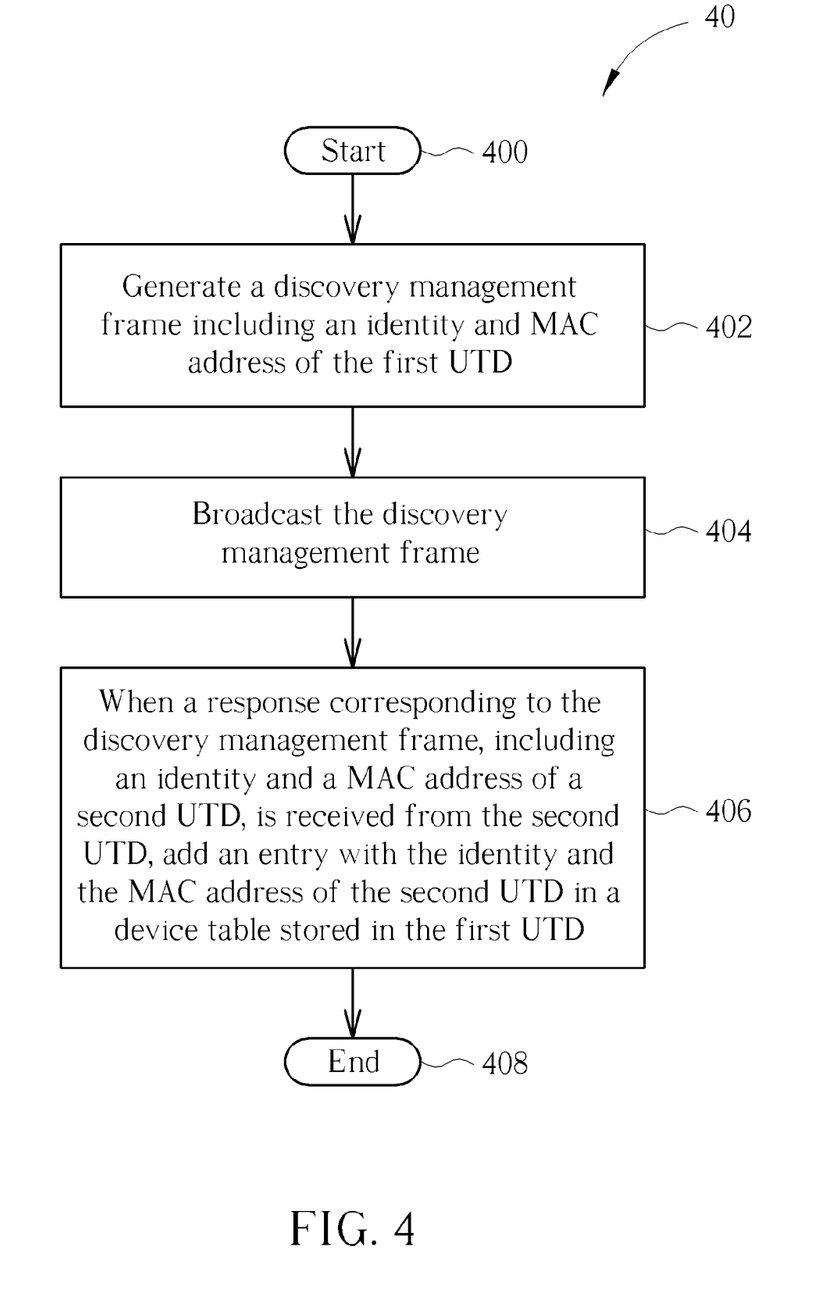
FIG. 4 is a flowchart of a process according to an example of the present invention.

Note that, the main feature of the present invention is to provide a device discovery process in a medium access control (MAC) abstraction sub-layer of a UTD. Please refer to FIG. 4, which is a flowchart of a process 40 according to an example of the present invention. The process 40 is utilized in a first UTD shown in FIG. 2, for processing device discovery. The process 40 may be compiled into the program code 214 of FIG. 3 and includes the following steps:

Step 400: Start.

Step 402: Generate a discovery management frame including an identity and MAC address of the first UTD.

Step 404: Broadcast the discovery management frame.

Step 406: When a response corresponding to the discovery management frame, including an identity and a MAC address of a second UTD, is received from the second UTD, add an entry with the identity and the MAC address of the second UTD in a device table stored in the first UTD.

Step 408: End.

According to the process 40, a UTD sends out at least a discovery management frame including its device identity and MAC address, and creates the device table with device identities and MAC addresses in the responses received from other UTDs.

Figure 5:
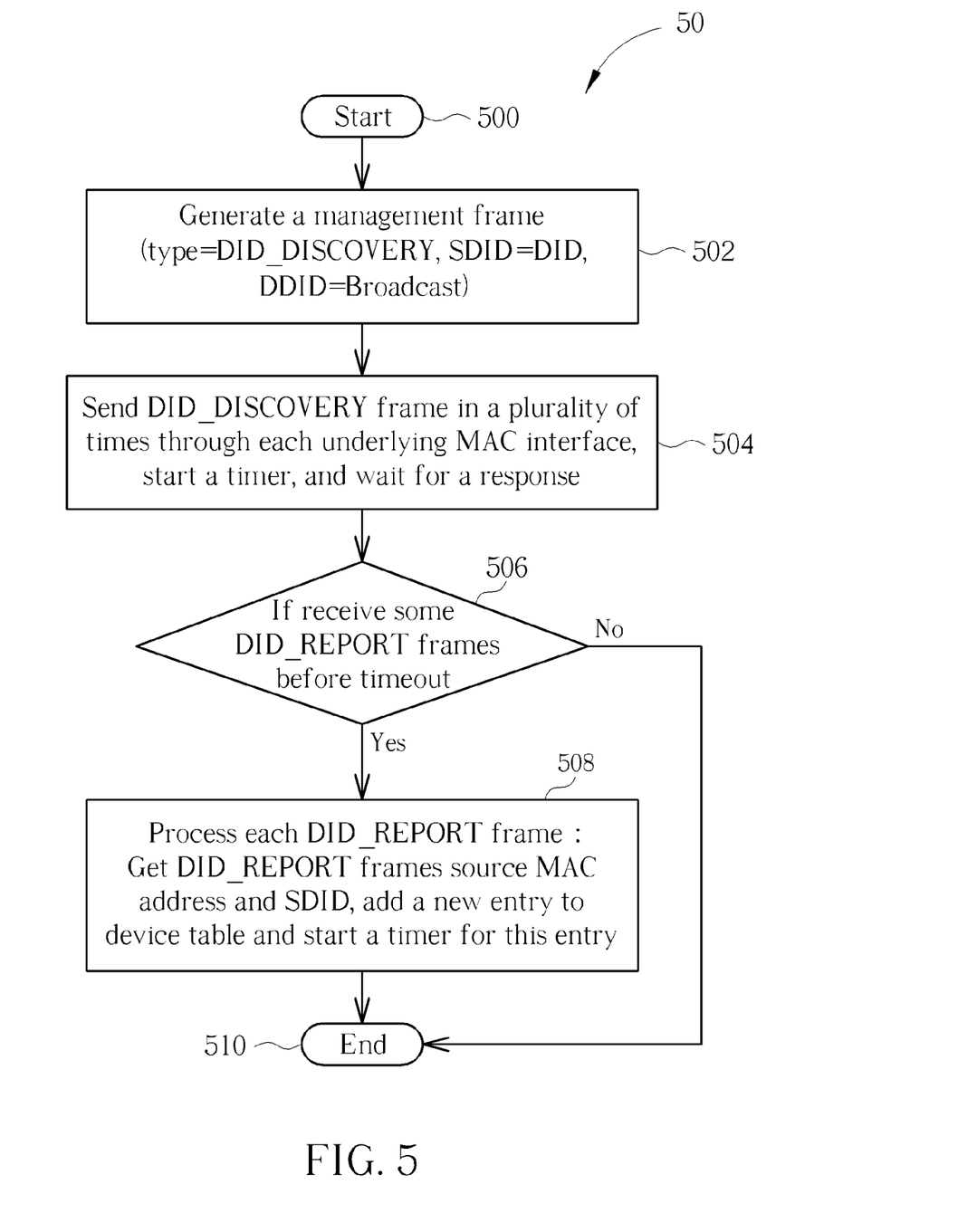
FIG. 5 is a flowchart of a device discovery process according to an example of the present invention.

Take an example based on the process 40. Please refer to FIG. 5, which illustrates a device discovery process 50 according to an example of the present invention. A first UTD generates a management frame including elements, a frame type, a source device identity (SDID) and a destination device identity (DDID) (step 502). In FIG. 5, the frame type of the management frame is set to DID_DISCOVERY, the SDID is set to the device identity DID of the first UTD, and the DDID is set to broadcast. The first UTD sends the DID_DISCOVERY frame in a plurality of times through media underlying the MAC abstraction sub-layer of the first UTD, and starts a timer for reception of a response corresponding to the DID_DISCOVERY frame (step 504). The response corresponding to the DID_DISCOVERY frame includes elements, a frame type set to DID_REPORT, a source MAC address and a SDID. If the first UTD receives some DID_REPORT frames from other UTDs before the reception timer expires, the first UTD processes each DID_REPORT frame (steps 506-508). For example, the first UTD receives the DID_REPORT frame from a second UTD. In this situation, the first UTD gets a MAC address and a device identity of the second UTD from the source MAC address and SDID of the DID_REPORT frame, and adds an entry with the device identity and the MAC address of the second UTD to the device table. Thus, the second UTD is regarded as a new entry for the first UTD. Further, the first UTD may start a timer for this entry. Note that, if the first UTD does not receive any DID_REPORT frame, the device discovery process 50 finishes.

Figure 6:
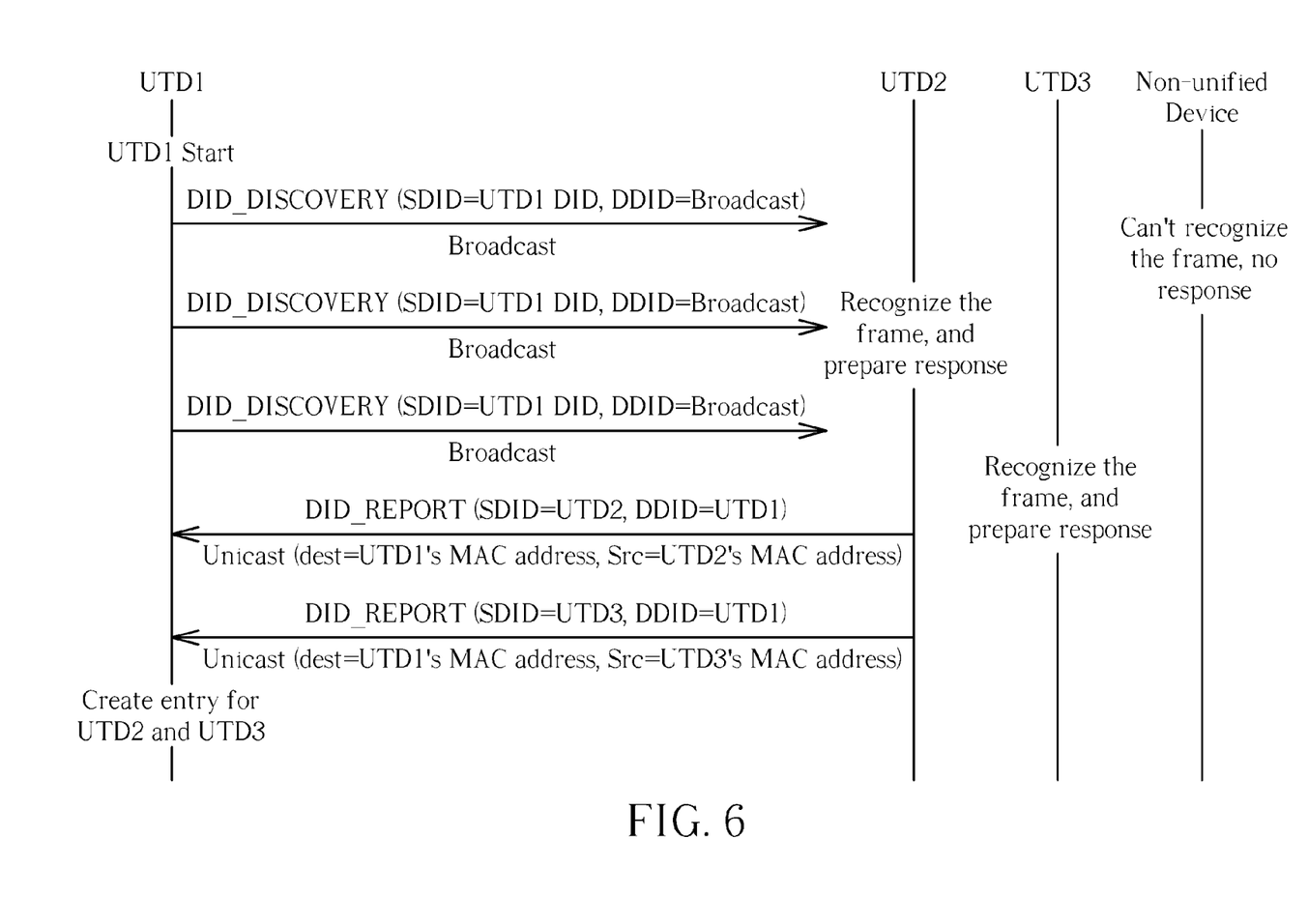
FIG. 6 is a transmission sequence diagram according to FIG. 5.

Moreover, please refer to FIG. 6, which is a transmission sequence diagram according to the device discovery process 50. In FIG. 6, the UTD1 sends a DID_DISCOVERY frame three times, whose SDID is set to the device identity DID of the UTD1, and DDID is set to broadcast. If the UTD2 recognizes the DID_DISCOVERY frame, the UTD2 responds the DID_DISCOVERY frame with a DID_REPORT frame, whose SDID is set to the device identity of the UTD2, and DDID is set to the device identity of the UTD1, to the UTD1. Note that, the DID_REPORT frame is unicasted to the UTD1 according to the MAC address of the UTD1. Similarly, if the UTD3 recognizes the DID_DISCOVERY frame, the UTD3 responds the DID_DISCOVERY frame with a DID_REPORT frame, whose SDID is set to the device identity of the UTD3, DDID is set to the device identity of the UTD1, to the UTD1. After the UTD1 receives the DID_REPORT frames from the UTD2 and UTD3, the UTD1 creates entries for the UTD2 and UTD3 (namely the UTD1 adds an entry with device identities of the UTD2 and UTD3 in the device table of the UTD1). However, if a UTD cannot recognize frame, the UTD does not respond to the DID_DISCOVERY frame.

Figure 7:
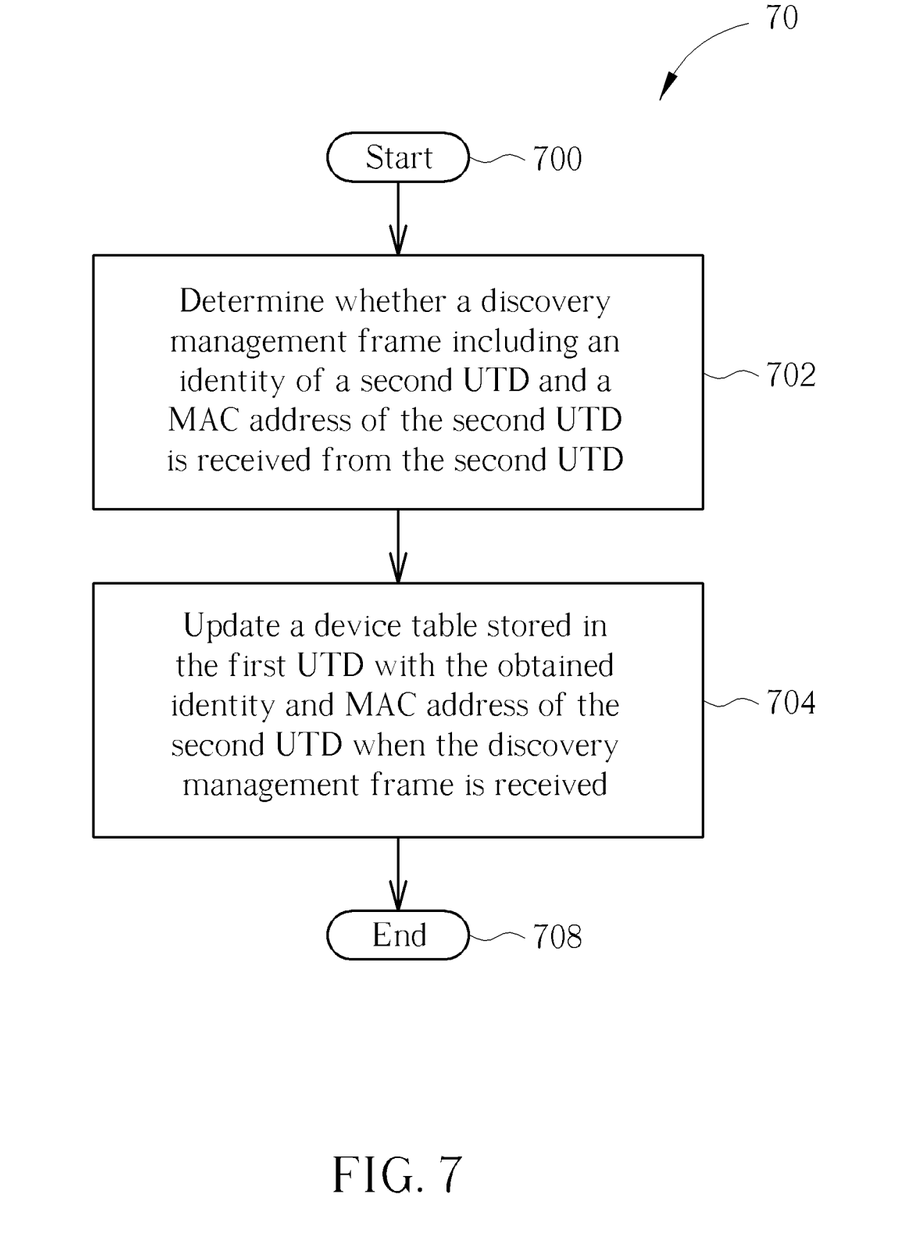
FIG. 7 is a flowchart of a process according to an example of the present invention.

Please refer to FIG. 7, which is a flowchart of a process 70 according to an example of the present invention. The process 70 is utilized in a first UTD shown in FIG. 2, for processing device discovery. The process 70 may be compiled into the program code 214 of FIG. 3 and includes the following steps:

Step 700: Start.

Step 702: Determine whether a discovery management frame including an identity of a second UTD and a MAC address of the second UTD is received from the second UTD.

Step 704: Update a device table stored in the first UTD with the obtained identity and MAC address of the second UTD when the discovery management frame is received.

Step 708: End.

According to the process 70, a UTD maintains the device table via the discovery management frames received from other UTDs. In detail, the UTD gets a MAC address and a device identity of another UTD from the discovery management frame, and thereby updates the device table with the MAC address and the device identity of the discovery management frame.

Figure 8:
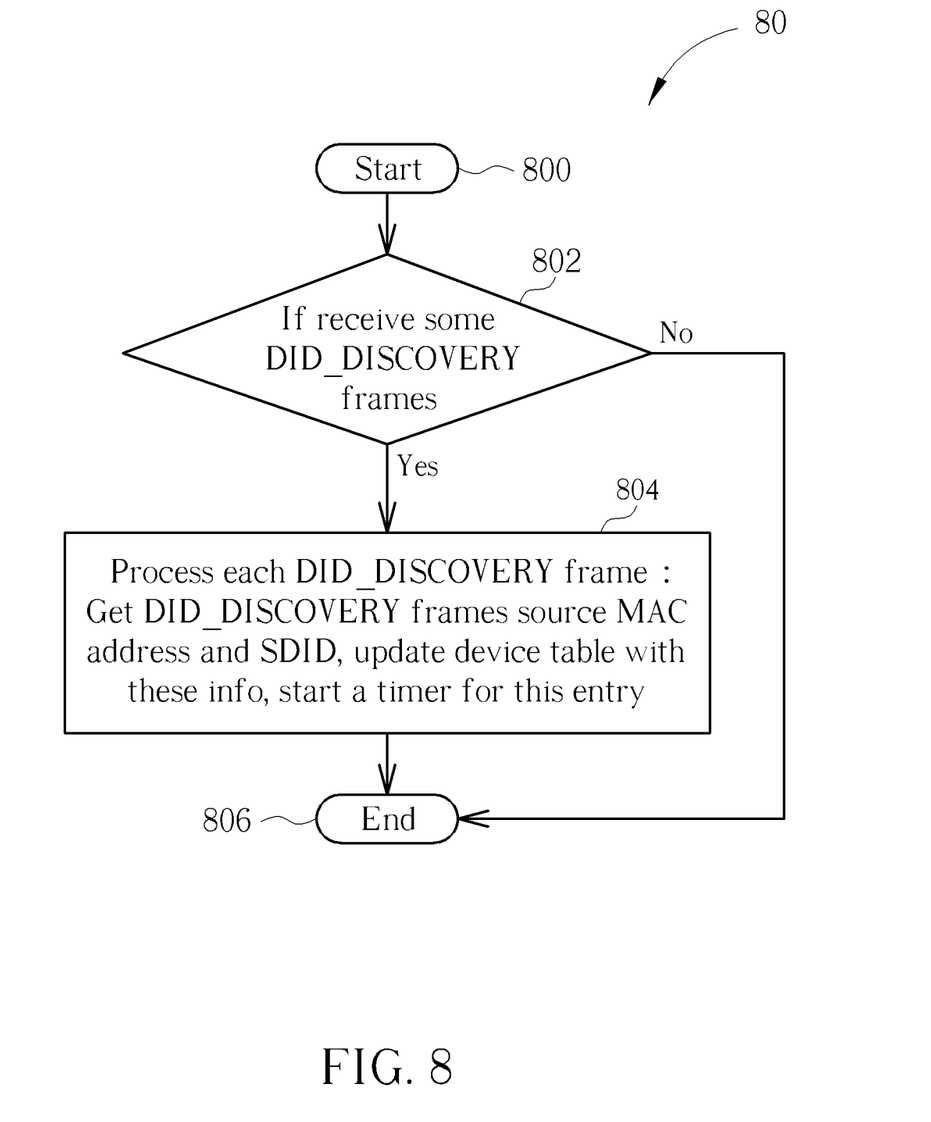
FIG. 8 is a flowchart of a device discovery process according to an example of the present invention.

Take an example based on the process 70. Please refer to FIG. 8, which illustrates a device discovery process 80 according to an example of the present invention. If a first UTD receives a DID_DISCOVERY frame from a second UTD, the first UTD processes the DID_DISCOVERY frame (steps 802-804). More specifically, the first UTD gets a MAC address and a device identity of the second UTD from the DID_DISCOVERY frame, and updates the device table with the MAC address and the device identity of the second UTD. In this situation, the second UTD is regarded as an entry for the first UTD. Further, the first UTD starts a timer for validity confirmation of this entry. However, if the first UTD does not receives any DID_DISCOVERY frame, the device discovery process 80 finishes.

Figure 9:
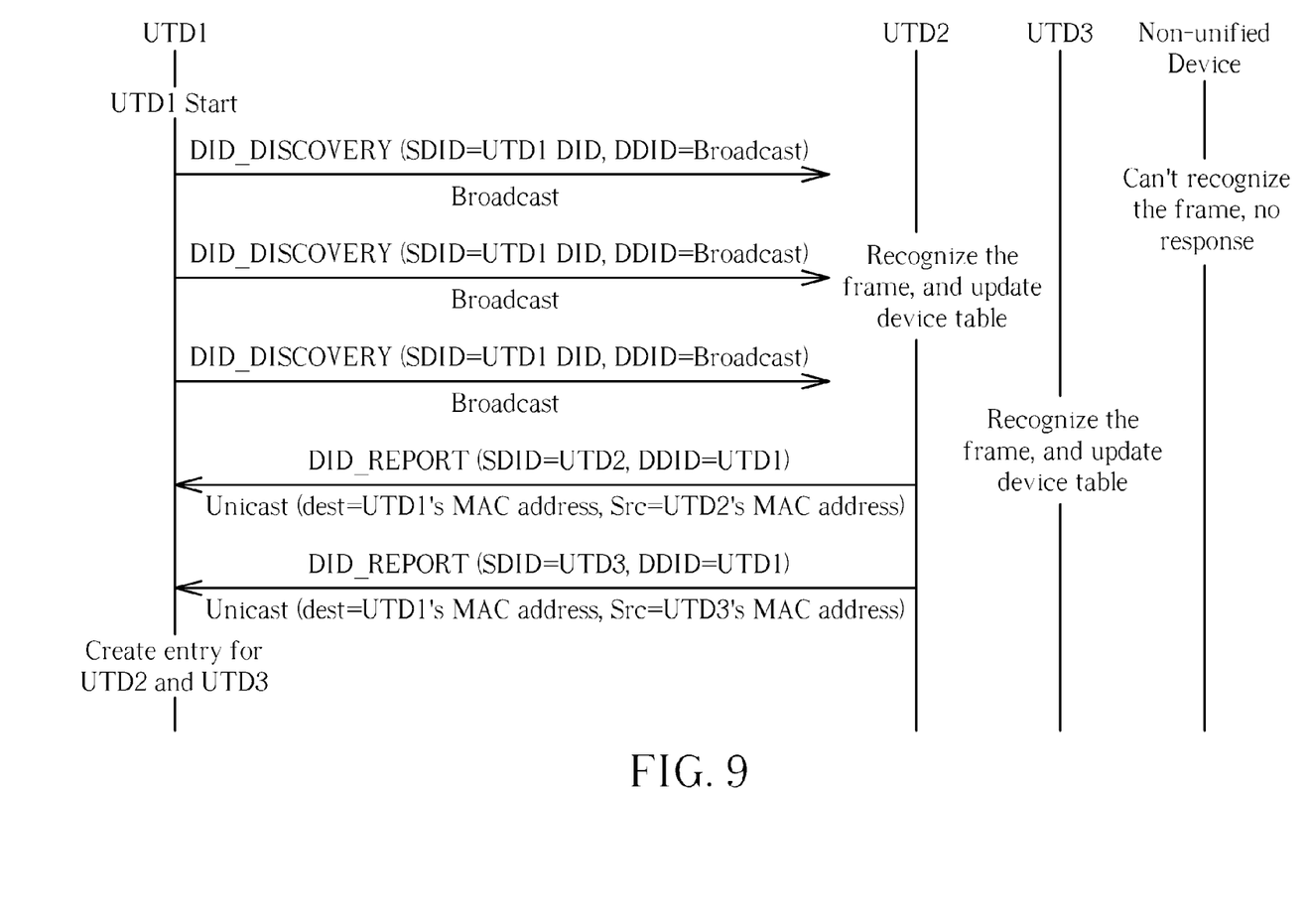
FIG. 9 is a transmission sequence diagram according to FIG. 8.

Moreover, please refer to FIG. 9, which is a transmission sequence diagram according to the device discovery process 80. In FIG. 9, the UTD1 sends a DID_DISCOVERY frame three times, whose SDID is set to the device identity of the UTD1, and DDID is set to broadcast. If the UTD2/UTD3 recognizes the DID_DISCOVERY frame, the UTD2/UTD3 responds the DID_DISCOVERY frame with DID_REPORT frame to the UTD1. Further, the UTD2/UTD3 updates its device table with information (the MAC address and device identity of the UTD 1) in the DID_DISCOVERY frame. Note that, UTD1 may initialize the device discovery process (namely broadcasting the DID_DISCOVERY frame) when the UTD1 changes its identity (i.e. the network assigns a new identity to the UTD), so that the other UTDs (i.e. the UTD2/UTD3) can update its device table immediately.

Figure 10:
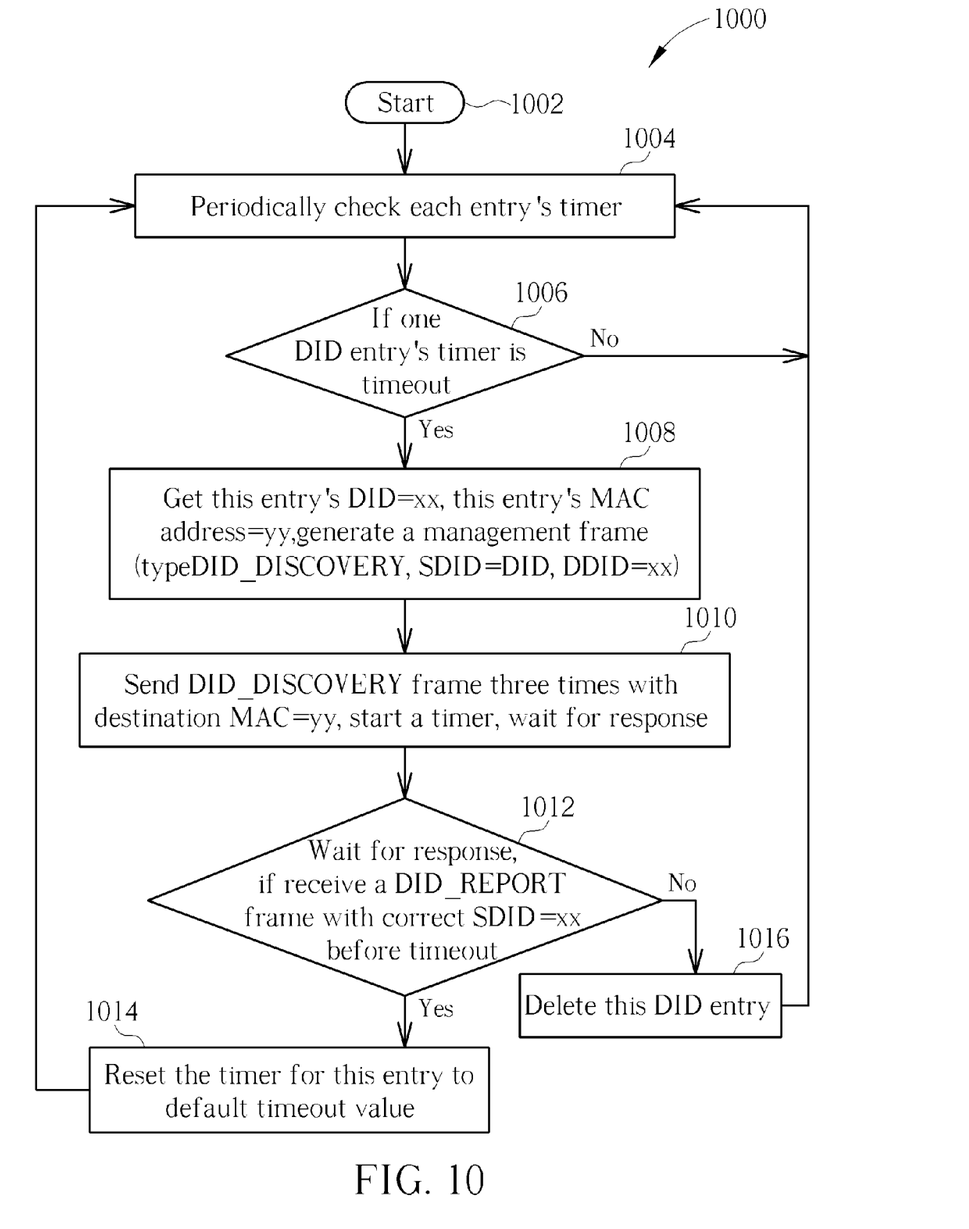
FIG. 10 is a flowchart of a timer checking process according to an example of the present invention.

As abovementioned, a UTD may start a timer for validity confirmation of an entry. Please refer to FIG. 10, which is a flowchart of a timer checking process 1000 for device table update. In FIG. 10, the UTD periodically checks each entry's timer, and if one entry's timer is timeout, the UTD gets this entry's identity XX and MAC address YY and generates a discovery management frame (steps 1004-1008). Note that, a frame type of the discovery management frame is set to DID_DISCOVERY, a SDID of the discovery management frame is set to device identity of the UTD, and DDID is set to the entry's identity XX. Then, the UTD sends the DID_DISCOVERY frame three times according to the entry's MAC address YY, and starts a timer for reception of a response corresponding to the discovery management frame (step 1010). If the UTD receives a DID_REPORT frame with identity XX before the reception timer is timeout, the UTD resets the validity timer for this entry to a default value (step 1014). On the other hand, if the UTD does not receive the DID_REPORT frame before the reception timer is timeout, the UTD deletes this entry (namely deletes entry's identity XX from the device table) (step 1016). As can be seen, with the timer checking process 1000, a UTD which has left the network can be deleted from the device table.

Figure 11:
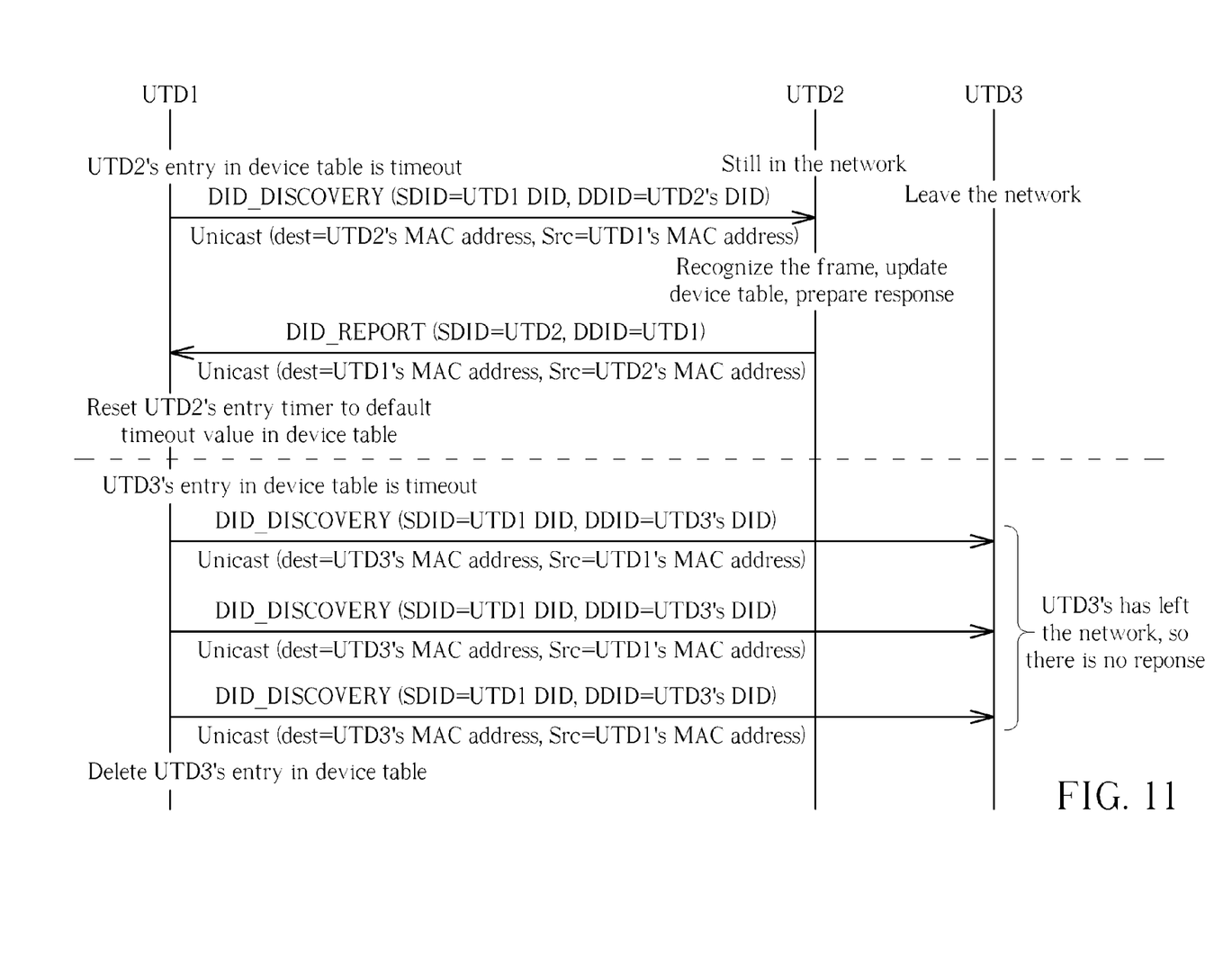
FIG. 11 is a transmission sequence diagram according to FIG. 10.

Moreover, please refer to FIG. 11, which is a transmission sequence diagram according to the timer checking process 1000. In FIG. 11, the UTD1 determines that the device identity of the UTD2 in device table is timeout, and then generates a DID_DISCOVERY frame with which SDID is set to the device identity of the UTD1, and DDID is set to the device identity of the UTD2. The UTD1 unicasts the DID_DISCOVERY frame to the UTD 2 according to the MAC address of the UTD2 in the device table. If the UTD2 recognizes the DID_DISCOVERY frame, the UTD2 responds the DID_DISCOVERY frame with DID_REPORT frame to the UTD1. Thus, the UTD1 resets the validity timer for the entry of the UTD2 to a default value. Similarly, if the UTD1 determines that the identity of the UTD3 in device table is timeout, the UTD1 generates a DID_DISCOVERY frame with which SDID is set to the device identity of the UTD1, and DDID is set to the device identity of the UTD3. The UTD1 continues unicasting the DID_DISCOVERY frame to the UTD3 according to the MAC address of the UTD3 in the device table. However, if the UTD3 has left the network, the UTD3 may not respond to the DID_DISCOVERY frame. In this situation, the UTD1 deletes the identity of the UTD3 from the device table.

Please note that, those skilled in the art may realize the device discovery processes 40, 50, 70 and 80, and the timer checking process 1000 by means of software, hardware or their combinations. More specifically, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for device discovery, so as to create and maintain the device table of a communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of processing device discovery based on MAC abstraction sub-layer with a plurality of MAC types of a MAC layer each corresponding to a medium specification for a first unified terminal device (UTD) in a network system, the method comprising:

generating a discovery management frame including an identity and a medium access control (MAC) address of the first UTD by the first UTD;

broadcasting the discovery management frame by the first UTD, wherein the discovery management frame is directly received by a second UTD, the first UTD communicates to the second UTD via the same medium specification; and when a response, which is corresponding to the discovery management frame, and includes an identity and a medium access control (MAC) address of a second UTD, is received from the second UTD, adding an entry with the identity and the MAC address of the second UTD in a device table stored in the first UTD.

2. The method of claim 1, wherein the discovery management frame further includes a broadcasting destination device identity (DDID), and the step of broadcasting the discovery management frame comprises:
sending the discovery management frame with a plurality of times.

3. The method of claim 1, further comprising:
starting a first timer indicating a period of time for reception of the response corresponding to the discovery management frame.

4. The method of claim 3, wherein the step of adding the entry with the identity and the medium access control (MAC) address of the second UTD in the device table stored in the first UTD comprises:
adding the entry with the identity and the medium access control (MAC) address of the second UTD in the device table when the response is received before the first timer expires.

5. The method of claim 4, further comprising:
starting a second timer for validity confirmation of the added entry with identity of the second UTD in the device table.

6. The method of claim 5, further comprising:
sending a second discovery management frame to the second UTD according to the MAC address of the second UTD when the second timer expires;
resetting the second timer when a second response corresponding to the second discovery management frame is received from the second UTD; and
deleting the entry with the identity of the second UTD from the device table when the second response is not received from the second UTD.

7. A method of processing device discovery based on MAC abstraction sub-layer with a plurality of MAC types of a MAC layer each corresponding to a medium specification for a first unified terminal device (UTD) in a network system, the method comprising:
directly receiving a discovery management frame, including an identity of a second UTD and a medium access control (MAC) address of the second UTD from the second UTD, by the first UTD, wherein the first UTD communicates to the second UTD via the same medium specification;
updating a device table stored in the first UTD with the obtained identity and MAC address of the second UTD when the discovery management frame is received by the first UTD; and
unicasting a response corresponding to the discovery management frame to the second UTD, by the first UTD, wherein the response includes an identity and a medium access control (MAC) address of the first UTD.

8. The method of claim 7, further comprising:
starting a timer for validity confirmation of the identity of the second UTD in the device table.

9. The method of claim 8, further comprising:
sending a second discovery management frame to the second UTD according to the MAC address of the second UTD when the timer expires;
resetting the timer when a response corresponding to the second discovery management frame is received from the second UTD; and
deleting an entry with the identity of the second UTD from the device table when the response is not received from the second UTD.

10. The method of claim 9, further comprising:
starting a second timer indicating a period of time for reception of the response corresponding to the second discovery management frame.

11. The method of claim 10, wherein the step of resetting the timer when the response corresponding to the second discovery management frame is received from the second UTD comprises:
resetting the timer when the response corresponding to the second discovery management frame is received from the second UTD before expiry of the second timer.

12. The method of claim 10, wherein the step of deleting the entry with the identity of the second UTD from the device table when the response is not received from the second UTD comprises:
deleting the entry with the identity of the second UTD from the device table when the response is not received from the second UTD before expiry of the second timer.

* * * * *